No. 775,405. PATENTED NOV. 22, 1904.
F. H. LONG.
PROCESS OF EXTRACTING METALS FROM THEIR ORES.
APPLICATION FILED JUNE 19, 1903.
NO MODEL.
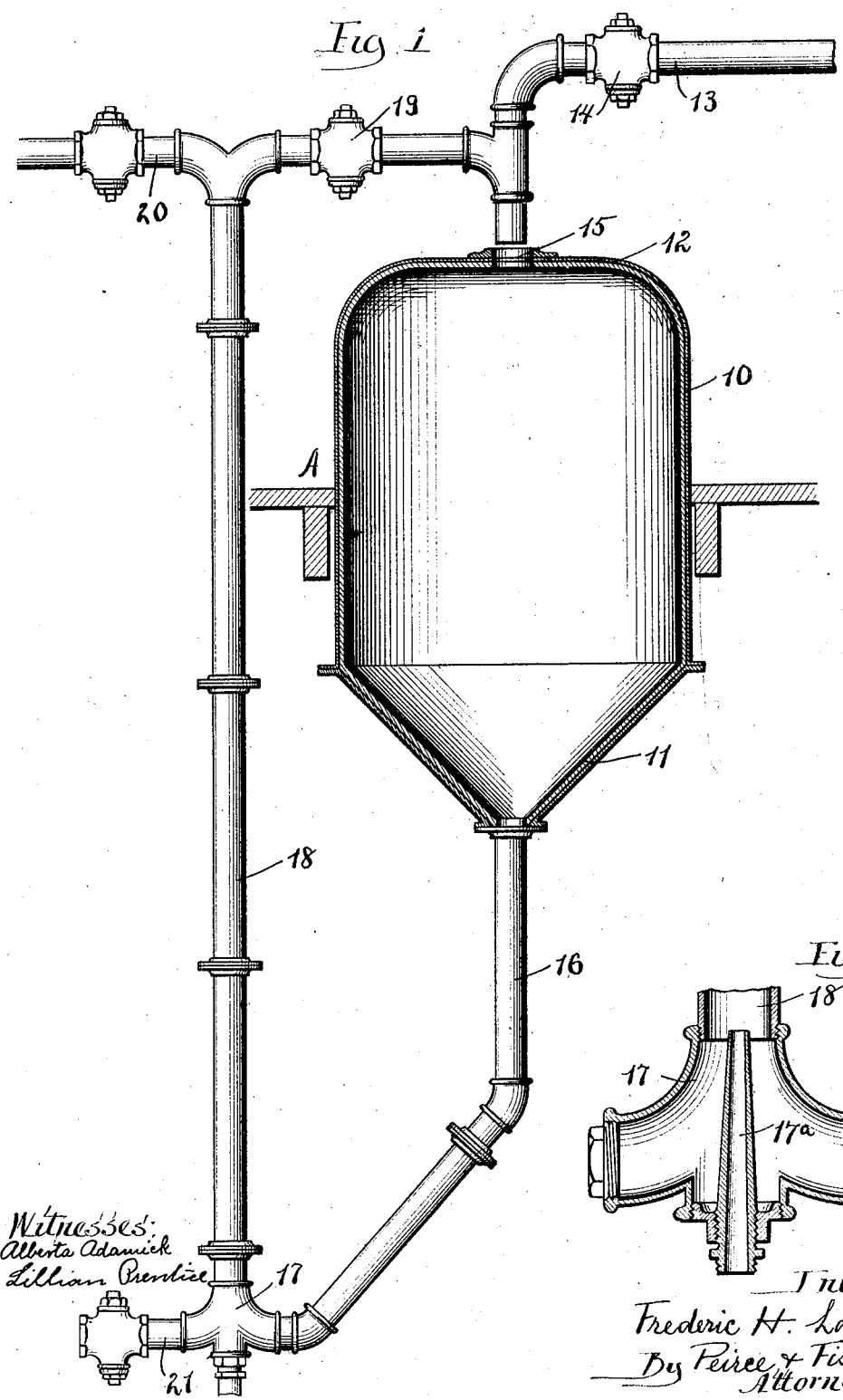
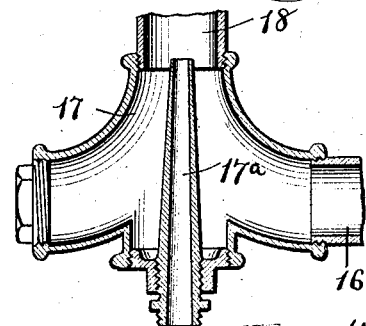
Witnesses:
Alberta Adamick
Lillian Prentice
Inventor:
Frederic H. Long
By Peirce & Fisher
Attorneys.

No. 775,405. Patented November 22, 1904.

UNITED STATES PATENT OFFICE.

FREDERIC H. LONG, OF CHICAGO, ILLINOIS.

PROCESS OF EXTRACTING METALS FROM THEIR ORES.

SPECIFICATION forming part of Letters Patent No. 775,405, dated November 22, 1904.

Application filed June 19, 1903. Serial No. 162,210. (No specimens.)

*To all whom it may concern:*

Be it known that I, FREDERIC H. LONG, a citizen of the United States, and a resident of Chicago, county of Cook, and State of Illinois, have invented certain new and useful Improvements in Processes of Extracting Metals from Their Ores, of which the following is declared to be a full, clear, and exact description.

The invention relates to processes for extracting metals from their ores, and more particularly to the extraction of gold and silver from their crushed ores by the action of a cyanid solution.

It has heretofore been well recognized that it is highly advantageous in carrying out the cyanid process to thoroughly agitate the entire mixture of crushed ore and solution and to provide for the presence of oxygen necessary to the chemical reaction. The present invention seeks to provide a process for effectually attaining these desired results; and it consists in the method of procedure hereinafter described, and more particularly pointed out in the appended claims.

Attempts have been made to supply the necessary oxygen by the addition of other chemicals to the cyanid solution and also to effect the desired agitation by mechanical means. The introduction of compressed air into the mixed pulp and solution during the leaching process has also been proposed, so as to supply the necessary oxygen and effect agitation of the charge in the leaching-vat. With the latter method considerable difficulty is experienced in maintaining a uniform pressure and distribution of the compressed air throughout the leaching-vat and in arranging the air pipes and nozzle, so that the formation of channels through the ore-pulp may be avoided.

In accordance with the present invention small charges of crushed ore and solution are preferably employed, and successive portions of the charge are continuously withdrawn from the bottom of the containing vat or vessel and returned into the top thereof, preferably by the aid of a jet of compressed air injected into the circulating charge. In this way the whole charge is circulated in successive portions past the air-jet and thoroughly exposed to the action of the incoming air and the oxygen therein. At the same time all solid matter is effectively held in suspension, so that slimes, as well as sands, may be successfully treated, thus avoiding the necessity of any preliminary separation of the two, and the ore may be more finely crushed than with the ordinary leaching process now employed.

In the accompanying drawings, Figure 1 is an elevation with parts in vertical section of a preferred form of apparatus used for carrying out the improved process. It will, however, be understood that any other suitable form of apparatus may be used. Fig. 2 is a detail view in vertical section of a part of the apparatus.

The vat or vessel A is preferably of sufficient capacity to contain a charge of from four to eight tons of crushed ore in accordance with the varying conditions and is preferably formed of a wood-lined metal tank-body 10, having a conical bottom 11 and a dome-shaped top 12.

The charge of crushed ore and cyanid solution is preferably run into the vessel A to the desired level from a preliminary mixer through an inlet-pipe 13, having a valve 14, which delivers through an opening 15 in the top of the vat or vessel. The inlet-pipe 13 instead of being arranged as shown in the drawings may fit snugly within the opening 15; but in this case the vessel A is preferably provided with a suitable vent-pipe leading from the upper portion thereof.

The entire charge in the vessel A is maintained in forced circulation, preferably by aid of a compressed-air ejector which operates continuously to withdraw the charge from the bottom of the vessel and return the same into the upper portion thereof. For this purpose a downwardly-extended bent pipe 16 connects the cone-shaped bottom of the vessel with the inlet-port of an air-ejector 17. The outlet-port of the ejector is connected by a return-pipe 18 with the upper portion of the vat or vessel A, which pipe opens for convenience into the inlet or feed pipe 13 intermediate the valve 14 and the top of the vessel. Air under pressure is supplied to the ejector-nozzle 17$^a$, and by this means the contents of the vessel is constantly withdrawn from the bottom of the vessel and returned into the top thereof, and by the vigorous circulation thus maintained all solid matter, slimes, as well as sands, are effectively held in suspension and thoroughly subjected to the action of the solvent. The constant withdrawal of successive portions of the charge from the lowest point of the vessel-bottom effectively overcomes the settling of solid matter therein. The circulation, moreover, is effected without the aid of centrifugal or other mechanical pump, which would be easily damaged by the abrading action of the sands and other solid matter contained in the charge. Moreover, all portions of the charge are compelled to circulate successively past the jet of incoming current of air, so that the oxygen necessary for the chemical reaction is effectively intermingled therewith, and the difficulty heretofore encountered of maintaining a uniform pressure and distribution of air throughout the charge and the necessity of a complicated arrangement of air pipes and nozzles are obviated.

The upper portion of the vessel A could be entirely open; but the dome-shaped top shown prevents excessive splashing.

The vertical pipe 18 leading from the ejector is provided at its upper end with a valve 19. Valved exit-pipes 20 and 21 are preferably connected to the upper end of pipe 18 and to the ejector 17.

In operation the valves in exit-pipes 20 and 21 are closed and valves 14 and 19 opened, and the mixed charge of crushed ore and cyanid solution is admitted to the vessel through the inlet-pipe 13. As the pulp and solution enter the vessel a jet of air under the desired pressure is admitted through the ejector-nozzle 17$^a$, so that the entire charge in the vessel is bodily circulated in an endless path during the leaching operation. Valve 14 is closed when the charge reaches the desired level in vessel A. When the charge has been sufficiently treated, valve 19 is closed and the valve in outlet-pipe 20 opened, so that the entire charge may be rapidly drawn out of the vessel by the action of the ejector and forced out through pipe 20 into a suitable filter. The apparatus may be completely drained at any time by opening the valve in outlet-pipe 21 at the lower portion of the apparatus.

It is obvious that other forms of apparatus could be employed in carrying out the improved process and that numerous changes could be made in the details of procedure without departure from the essentials of the invention.

Having described my invention, what I claim as new, and desire to secure by Letters Patent, is—

1. That improvement in the cyanid process of extracting precious metals from their ores that consists in effecting the passage of the entire charge of mixed ore and cyanid solution in successive portions through a contracted channel by injecting into said channel an air-blast of sufficient force and volume to maintain the flow of the charge and to revivify the cyanid and clear the ore.

2. That improvement in the cyanid process of extracting precious metals from their ores that consists in effecting the repeated circulation of the entire charge of mixed ore and cyanid solution in successive portions through a contracted channel by injecting into said channel an air-blast of sufficient force and volume to maintain the circulation of the charge and to revivify the cyanid and clear the ore while such circulation persists.

FREDERIC H. LONG.

Witnesses:
　　HARRY L. CLAPP,
　　ALBERTA ADAMICK.